United States Patent [19]

Okano

[11] Patent Number: 4,609,948

[45] Date of Patent: Sep. 2, 1986

[54] APPARATUS TO CONTROL TIME BASE FLUCTUATION IN A SIGNAL FROM A DEVICE FOR REPRODUCING RECORDED INFORMATION FROM A RECORDING DISC

[75] Inventor: Takashi Okano, Tokorozawa, Japan

[73] Assignee: Pioneer Video Corporation, Tokyo, Japan

[21] Appl. No.: 447,286

[22] Filed: Dec. 6, 1982

[30] Foreign Application Priority Data

Dec. 8, 1981 [JP] Japan .................................. 56-197193

[51] Int. Cl.⁴ .......................................... H04N 5/781
[52] U.S. Cl. ..................................... 358/338; 358/342
[58] Field of Search ....................... 358/312, 320-322, 358/336-339, 342; 360/10.1, 10.3, 33.1, 36.1, 38.1

[56] References Cited

U.S. PATENT DOCUMENTS

| | | | |
|---|---|---|---|
| 4,330,791 | 5/1982 | Ohara et al. | 358/320 |
| 4,358,796 | 11/1982 | Ceshkovsky et al. | 358/322 |
| 4,388,713 | 6/1983 | Tatsuguchi | 358/342 X |
| 4,389,678 | 6/1983 | Mizukami et al. | 360/10.3 |
| 4,403,259 | 9/1983 | Masaki | 358/342 |
| 4,415,935 | 11/1983 | Suzuki | 358/320 |
| 4,423,498 | 12/1983 | Kimura et al. | 358/338 X |

Primary Examiner—Donald McElheny, Jr.
Attorney, Agent, or Firm—Fleit, Jacobson, Cohn & Price

[57] ABSTRACT

A time base control unit in an apparatus for reproducing recorded information from a disc is provided, which comprises information reproduction processing means for reading and processing the recorded information, disc rotating means, tracking servo means for jumping an information read-spot, sync separating means for separating a sync signal from the information signal read, reference signal generating means, means for detecting a relation between the sync and reference signals and for outputting a phase difference signal, and time base servo means for compensating the time base fluctuation of the reproduction information signal in response to the phase difference signal. The reference signal generating means serves to coincide the phases of the sync signal and the reference signal before and after the jumping operation in order to permit the time base servo control such as spindle servo or tangential servo to be locked-in immediately after the jumping operation of the read-spot. For this purpose, the reference sync signal generating means is provided with fundamental signal generating means, integrating means and stopping means.

5 Claims, 8 Drawing Figures

APPARATUS TO CONTROL TIME BASE FLUCTUATION IN A SIGNAL FROM A DEVICE FOR REPRODUCING RECORDED INFORMATION FROM A RECORDING DISC

BACKGROUND OF THE INVENTION

The present invention relates to an apparatus for reproducing recorded information from a recording disc, and more particularly to a time base control unit in an apparatus for reproducing recorded information from an information recording disc such as a video disc, digital audio disc or the like in which a video signal, a PCM digital audio signal or the like, which disc has playback mode functions which require jumping operations such as still (STILL), search (SEARCH), slow (SLOW), or fast (FAST), etc.

In general, there is known a disc reproducing apparatus for reproducing an information recording disc (referred to disc simply hereinbelow) such as a color video disc, a digital audio disc or the like in which a color video signal including video information such as a composite color video signal and so on, or a PCM digital audio signal which had been time base compressed has been recorded optically, electrostatically, electromagnetically, or mechanically. Such a disc reproducing apparatus as mentioned above generally has an ordinary sequential playback mode function and other playback mode functions such as still (still picture) playback, fast (interger multiple speed) playback or the like which require the jumping operation for jumping a read-spot (information detection area) from one track to another track which is one pitch or more apart therefrom.

FIGS. 1(A), (B) and (C) illustrate the three kinds of transit traces of a read-spot on track T of a disc 1 in case of a sequential playback, still picture playback and three times normal playback.

On the other hand, in a disc reproducing apparatus, the time base fluctuation is noted in reproduced signals derived from the read-pickup due to wow and flutter in a disc rotation driving motor (i.e. spindle motor) rotating the disc at a constant speed, and off-center disc, or the like. To restrain such time base fluctuation in the reproduction signal, a spindle servo or tangential servo is applied. However, in order to perform such spindle servo or tangential servo control, the following method has been done conventionally; that is, a reproduction synchronization signal (refered sync signal hereinbelow) such as horizontal synchronization pulse (refered sync pulse hereinbelow) or the like is extracted from a video signal to be obtained from the disc, and a phase difference signal is generated which is indicative of a phase difference between this reproduction sync signal and a reference sync signal to be generated in the recording disc reproducing apparatus, then the rotating speed of the spindle motor is controlled or the tangential velocity of a recording track on the disc of the read-spot is controlled so that the phase difference represented by the above-mentioned phase difference signal becomes small.

An embodiment of a spindle servo circuit as a time base control circuit by the above-stated phase difference signal will be described with reference to FIG. 2, in which the video disc 1 is rotated by a spindle motor 2. In case of a CAV type video disc, the spindle motor 2 rotates the video disc 1 at a constant angular velocity, and in case of a CLV type video disc, it rotates the video disc 1 so that the tangential velocity on the track of a read-spOt of a read-pickup 3 is always constant. The read-pickup 3 is positioned by a tracking servo system 4 so as to trace a desired track. In a particular playback mode which requires the jumping operation such as still playback or the like, the tracking servo system 4 serves to jump the read-spot of the read-pickup 3 according to a jump command to be supplied from a control circuit (not shown). An example of such a control circuit for generating a jump command is disclosed in U.S. Pat. No. 4,403,259 filed Sept. 28, 1981.

The signal derived from the above read-pickup 3 is demodulated by a demodulator 5 to produce a video signal. This video signal is fed to a picture reproduction circuit (not shown), which circuit is well known, so its detail is omitted herein. On the other hand, a separator 6 separates a reproduction sync signal such as a horizontal sync pulse or the like which is included in the video signal, and supplies to an input terminal of a phase comparator 7. The phase comparator 7 receives at the other input terminal a reference sync signal of a prescribed frequency from a reference sync signal generator 8. The phase comparator 7 generates a phase difference signal indicative of a difference of the phases between the reference sync signal and the reproduction sync signal, and supplies to a spindle servo circuit 10 through a sample holder 9. The spindle servo circuit 10 controls the rotating speed of the spindle motor in response to this phase difference signal to execute the spindle servo operation.

As described above, in a conventional disc reproducing apparatus, the time base fluctuation of the information signal read from the disc is detected by way of a phase difference between the sync signal included in the reproduction information signal and the reference sync signal of a prescribed frequency. In the case where a CLV-type disc is played back and the jumping operation is performed by such a disc reproducing apparatus as mentioned above, the sections where sync signals have been recorded in the CLV-type disc are not arranged in the radial direction, therefore, fairly a long time is required until the time base servo system becomes stable. Furthermore, in an extreme case, the time base servo system becomes out of order due to too much big disturbance caused by the jumping operation.

SUMMARY OF THE INVENTION

It is therefore an object of the invention to provide an apparatus for reproducing recorded information from a recording disc in which even after the jumping operation has been performed while in the playback mode of a disc of the type such as a CLV-type disc or the like in which the sections where sync signals have been recorded are not arranged in the radial direction, the time base servo such as a spindle servo, a tangential servo or the like is immediately locked in.

According to an apparatus for reproducing recorded information from a recording disc of the invention, reference signal generating means serves to coincide or synchronize the phase of the reference signal to the sync signal at the end of the jumping operation with the phase of the same at the start time of the jumping operation.

Briefly described, these and other objects of the invention are accomplished by the provision of a time base control unit in an apparatus for reproducing recorded information from an information recording disc having (a) rotation driving means for rotating the information recording disc; (b) information reproduction processing means for reading a recorded information signal from a prescribed information truck recorded in said disc and for performing a reproduction processing of the information read-spot of said information reproduction means from a truck to another truck in accordance with a jump command, wherein said time base control unit further comprising (1) sync separating means for separating a sync signal from the information signal read; (2) reference signal generating means for generating a reference signal of a prescribed frequency; (3) phase difference detecting means for detecting a phase relation between said sync signal and said reference signal and for outputting a phase difference signal; and (4) time hase servo means for compensating the time base fluctuation of said reproduction information signal in accordance with said phase difference signal, and wherein said reference signal generating means serving to coincide the phase of said reference signal to said sync signal at the end of jumping operation or immediately after said operation with the phase of the reference signal to said sync signal when said jump command is generated of immediately after the generation thereof in response to said jump command.

BRIEF DESCRIPTION OF THE DRAWINGS

The features and advantages of a time base control unit according to the present invention will be more clearly appreciated from the following description taken in conjunction with the accompanying drawings, in which.

DESCRIPTION OF THE PREFERRED EMBODIMENTS

Figure 1:
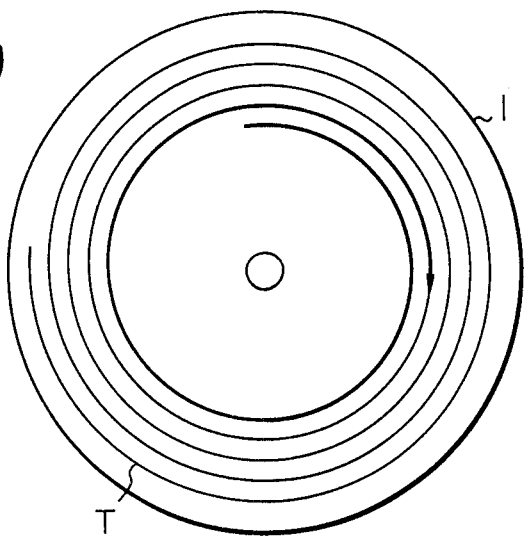
FIGS. 1(A), (B) and (C) are schematic views illustrating the movements on a disc of a read-spot in a disc reproducing apparatus in case of the ordinary playback, still playback and fast playback modes, respectively.
Figure 1:
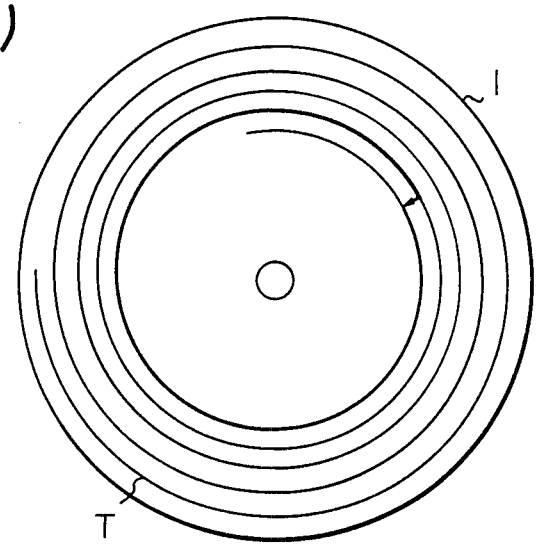
Figure 1C:
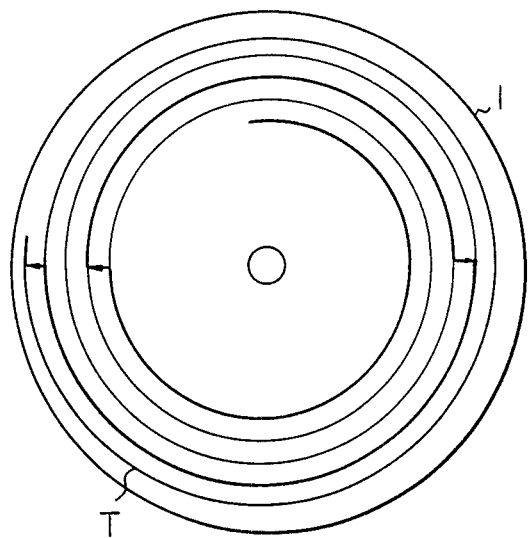
Figure 2:
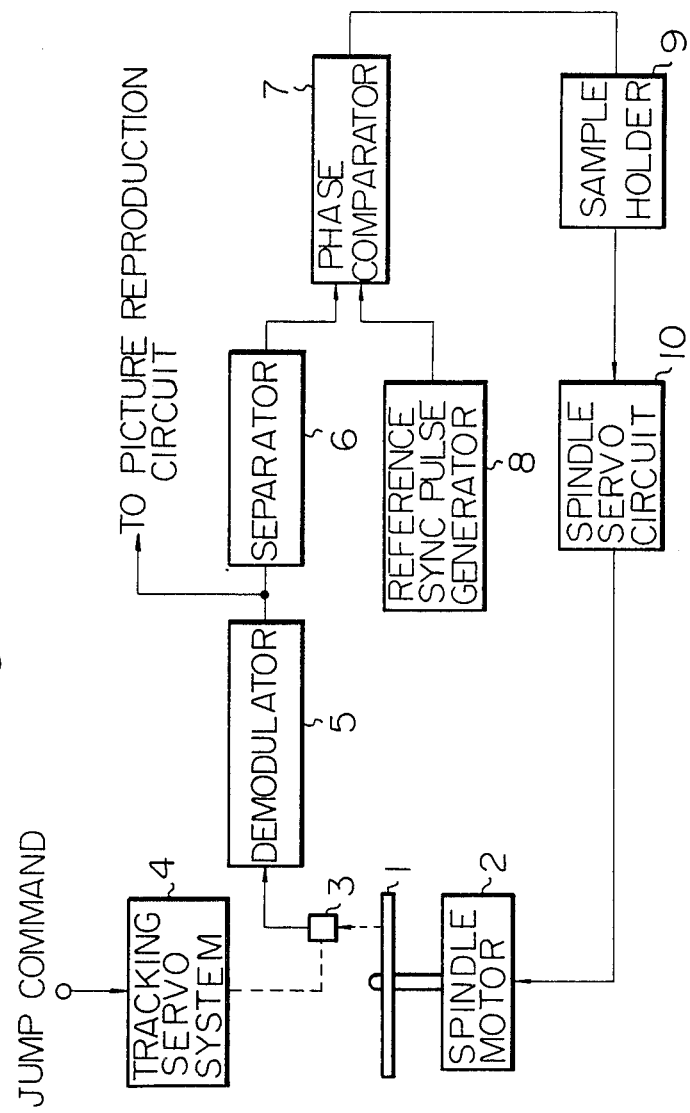
FIG. 2 is a block diagram showing a spindle servo system in a conventional disc reproducing apparatus.
Figure 3:
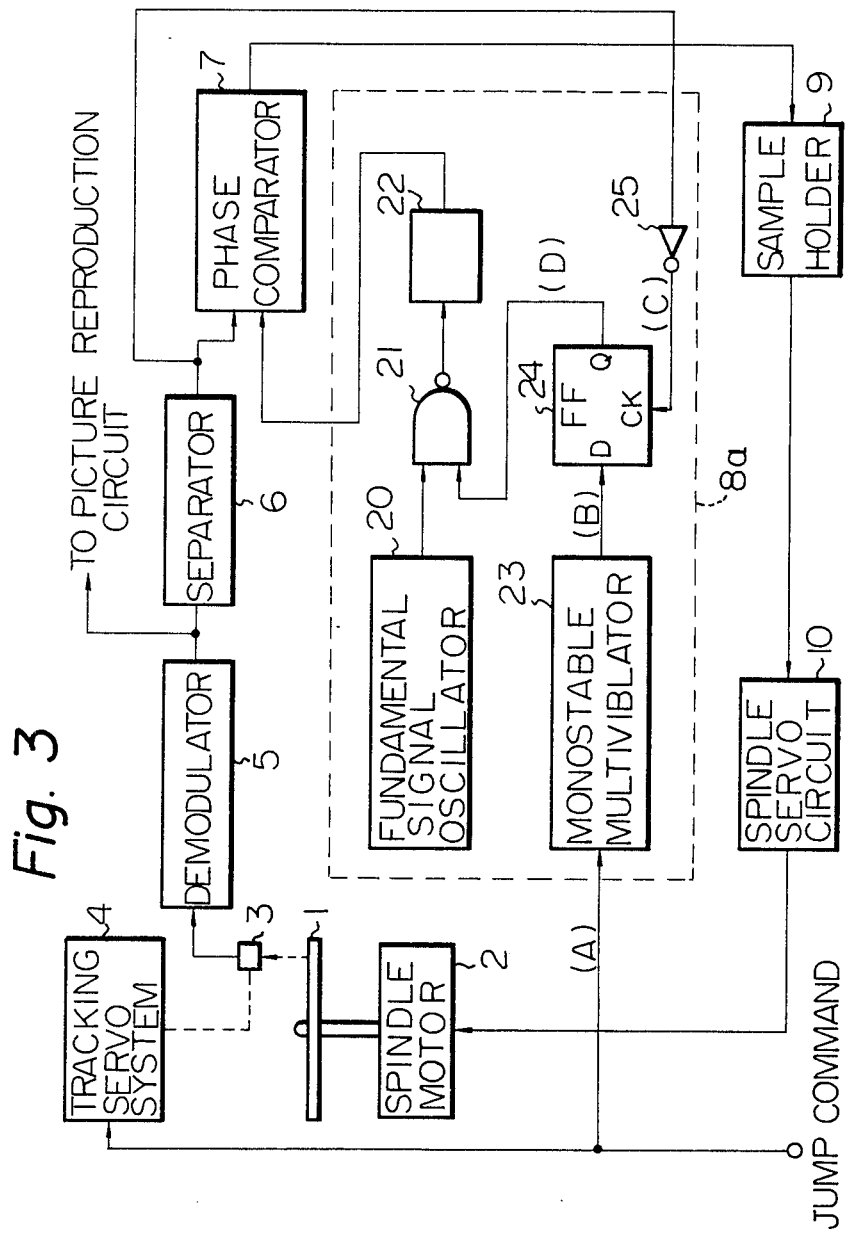
FIGS. 3 and 5 are block diagrams showing an embodiment of a spindle servo system in a disc reproducing apparatus according to the present invention.

FIG. 3 shows an apparatus for reproducing recorded information from an information recorded disc according to the present invention, in which like reference numerals designate similar or corresponding circuits and components as FIG. 2 except that a reference sync signal generator 8a has a construction different from the reference sync signal generator 8 in a conventional example shown in FIG. 2.

Returning to FIG. 3, the reference sync signal generator 8a will be described in detail hereinbelow. This generator 8a includes a fundamental signal oscillator 20 for generating a fundamental pulse signal of a frequency of approximately N times (N is an arbitrary integer of 2 or more) the frequency of a reproduction sync signal such as a horizontal sync signal or the like derived from the separator 6. A fundamental signal from the fundamental signal oscillator 20 is supplied to an N-radix notation counter 22 as a 1/N divider through an input terminal of a NAND gate 21. The N-radix notation counter 22 divides the frequency of the fundamental signal into 1/N and then supplies this fundamental pulse signal to the phase comparator 7 from its most significant digit as a reference sync signal. Therefore, while a logic "1" signal is supplied to the other input terminal of the NAND gate 21, the fundamental signal is fed to the N-radix notation counter 22 and the reference sync signal is supplied to the phase comparator 7.

On one hand, a monostable multivibrator 23 generates a single pulse having a predetermined pulse width by being triggered by a lead edge of a jump command pulse. The width of this single pulse must be longer than the time which is required to complete one jumping operation of the reading means 3 by way of the tracking servo 4. This single pulse is supplied to a data input terminal D of a D-type flip-flop 24. The D-type flip-flop 24 receives at its clock input terminal CK a reproduction sync signal from the separator 6 through an inverter 25. A Q output of the D-type flip-flop 24 is supplied to the other input terminal of the NAND gate 21.

Figure 4:
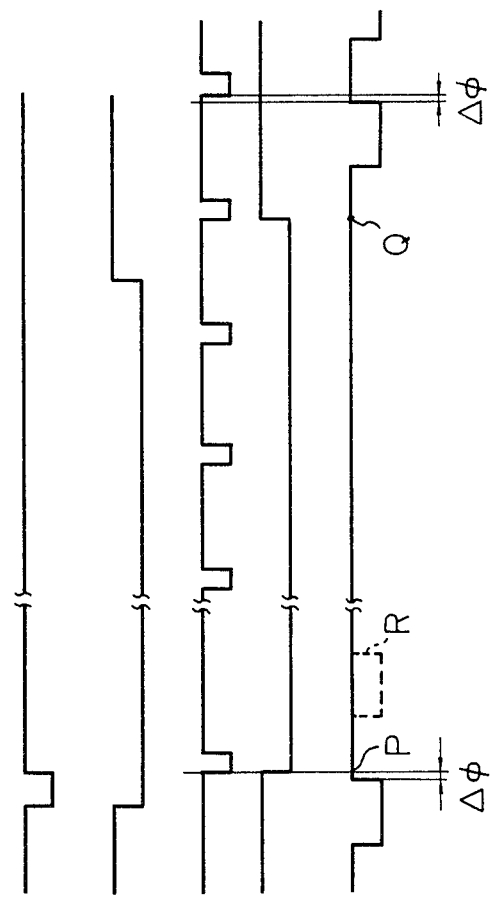
FIGS. 4 and 6 are waveform illustrations for showing the operations of the respective circuits in FIGS. 3 and 5.

In the above-mentioned disc reproducing apparatus, a logic "1" signal is output as a Q output of the D-type flip-flop during an ordinary operation, the NAND gate 21 supplies a fundamental signal from the fundamental signal oscillator 20 to the N-radix notation counter 22, and the counter 22 generates a reference signal. Next, in the case where the STILL playback or FAST playback is requested and such a wave-like jump command pulse as shown in FIG. 4(A) is supplied from a control circuit (not shown), the monostable multivibrator 23 generates such a negative pulse having a predetermined pulse width as shown in FIG. 4(B). At this time, the D-type flip-flop 24 is triggered by a reproduction sync pulse (FIG. 4(D)) appearing firstly after the generation of the above jump command pulse, a negative pulse as a logic "0" signal is generated from its Q output terminal, thereby the NAND gate 21 stops the passage of the fundamental signal. Consequently, the N-radix notation counter 22 stops the counting operation at point P of the pulse of FIG. 4(E), and keeps this state. Thus, the output of the N-radix notation counter 22 is held as it is and rather than changing as indicated by a broken line R of FIG. 4(E).

When the tracking servo system 4 finishes the jumping operation of the read-pickup in response to the jump command pulse, the reproduction sync signal is sent again from the separator 6. After that, the D-type flip-flop 24 is inverted by the head edge of the first reproduction sync pulse after the negative pulse from the monostable multivibrator 23 has been finished, and such a logic "1" signal (corresponds to the positive state of the pluse) as shown in FIG. 4(D) is generated as its Q output to start integration by the N-radix notation counter 22 again from point Q of FIG. 4(E). The content of the count of the N-radix notation counter 22 is maintained as it is from the time of count stop at point P, and the output of the N-radix notation counter 22 traces the similar waveform such as shown by a broken line R, after that it returns an ordinary operation. It is now assumed that point P, which is the count stop time point of the N-radix notation counter 22, coincides and is synchronized with the head edge of the reproduction sync pulse, and that a phase difference between this lead edge and the reference sync pulse signal (E) is $\Delta\phi$, there is a large possibility that a phase difference between the lead edge of the first reference sync pulse (E) after count restarting and the head edge of the corresponding reproduction sync pulse (C) keeps $\Delta\phi$ (refer to FIG. 4(E)), or quite small difference may be occored, if any so that the spindle servo is immediately locked-in.

In the above-described embodiment, a phase difference signal is used for the spindle servo control, but it can be also applied to either or both the spindle servo control and the tangential servo control. Although a horizontal sync pulse signal is used as a reproduction sync signal, it is also possible to use such a prescribed pulse signal as disclosed in U.S. patent application Ser. No. 265,929 filed May 21, 1981, now U.S. Pat. No. 4,422,103, which signal is derived by the combination of a burst signal and a horizontal sync pulse signal.

The integrating means is not limited to the N-radix notation counter, but it is also possible to use analog integrating means, for example, the combination of a sawtooth wave generator, a comparator and a two-way stable multivibrator to obtain a similar function to 1/N divider.

DESCRIPTION OF ANOTHER EMBODIMENT

Figure 5:
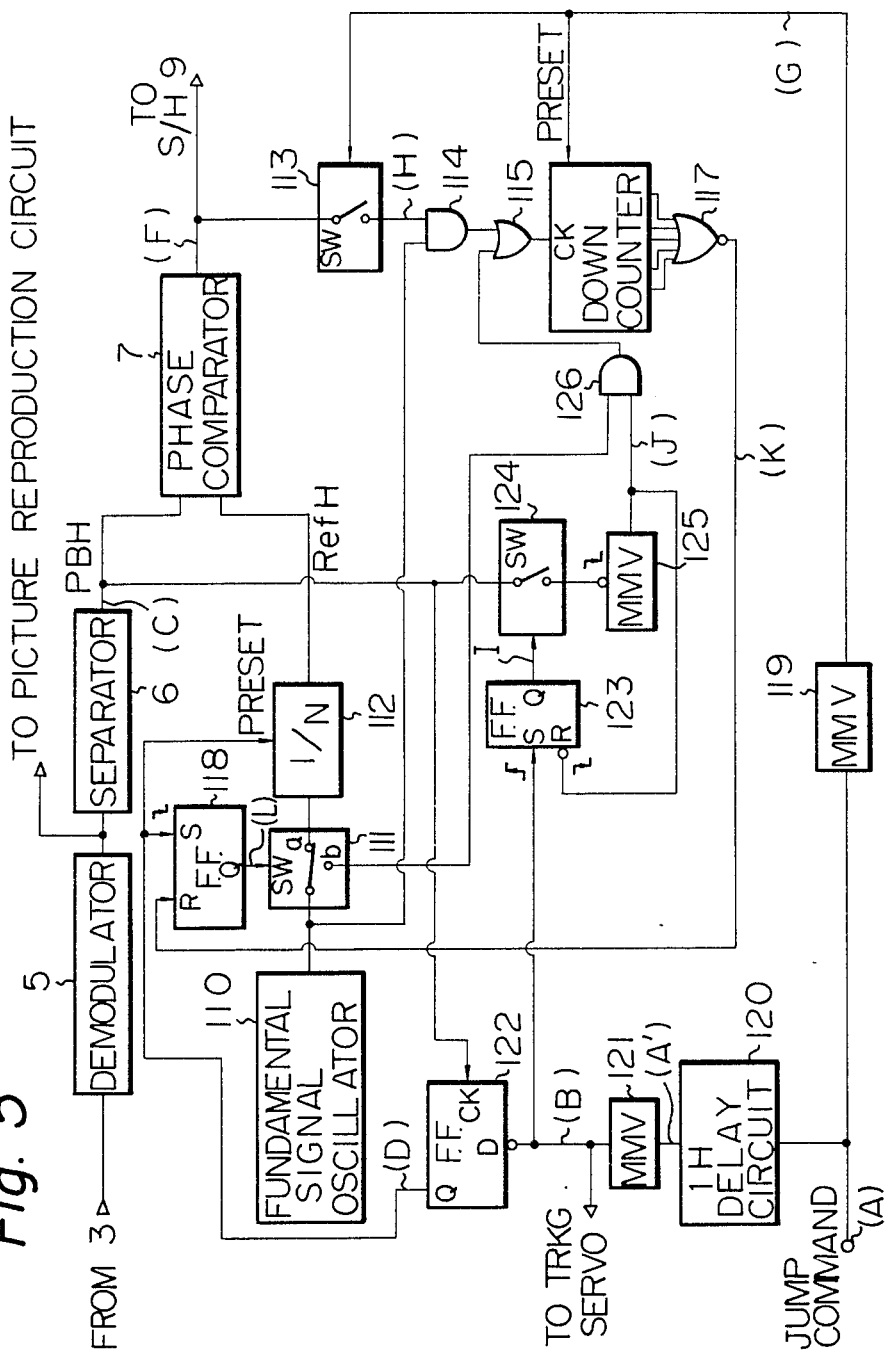
Figures 6A, 6B, 6C, 6D, 6E, 6F, 6G, 6H, 6I, 6J, 6K, 6L:
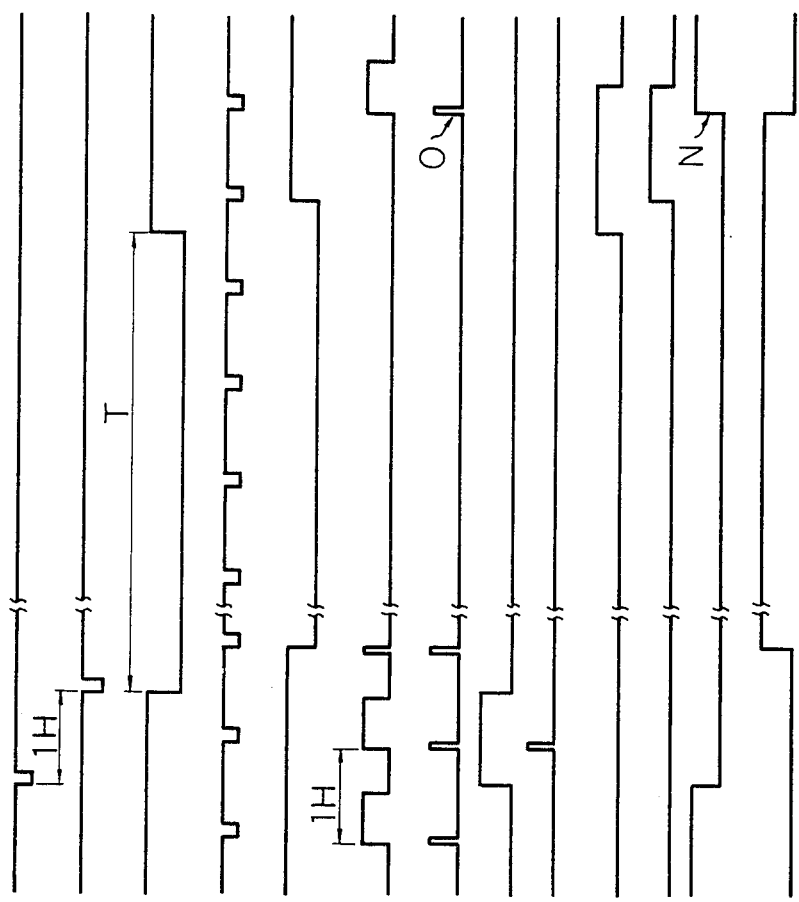

Another embodiment of the present invention will be described in detail hereinafter with reference to FIGS. 5 and 6, in which like reference numerals indicates similar or corresponding circuits and components as an embodiment of the disc reproducing apparatus of FIG. 3.

In this embodiment, a fundamental signal oscillator 110 generates a fundamental signal of a frequency of N times (N is an arbitrary integer of 2 or more) that of a reference sync signal which is a reference of the time base, this fundamental signal is input to a presettable N-radix notation counter 112 as a 1/N divider through a first switching circuit 111. The fundamental signal divided by the N-radix notation counter 112 becomes a reference sync signal, which is supplied to an input terminal of the phase comparator 7, where a phase difference signal between this signal and a reproduction sync pulse signal from the extractor 6 is detected.

This phase difference signal is supplied to an AND gate 114 through a second switching circuit 113 to produce an OR signal with the fundamental signal, after that it is further supplied to a clock input of a presettable down counter 116 through an OR circuit 115. The output of the down counter 116 is supplied to a NOR circuit 117 as a zerodetector which detects that the content of the counter is "0", and the output of the NOR circuit 117 is supplied to a reset terminal of a first FF (flip-flop) 118. The output of the first FF here is supplied to switch the first switching circuit 111.

On the other hand, a jump command signal is supplied to a first MMV (monostable multivibrator) 119 and a pulse delay circuit 120. The output of the first MMV 119 is supplied to the preset terminal of the down counter 116 and the second switching circuit 113. The output of the delay circuit 120 is fed to a second MMV 121, and its output is supplied to a data input terminal of a D-FF (D-type flip-flop) 122 and a set input terminal of a second FF 123. This signal is further output as a jump command signal to the tracking servo apparatus. The output of the second FF is input as its switching signal to a third switching circuit 124. The second FF 123 is reset by the output of a third MMV 125 to be triggered by the reproduction sync signal supplied through the third switching circuit 124. The output of the MMV 125 is further supplied to a second AND gate 126 to determine whether the fundamental pulse signal is supplied to the down counter 116 through the OR circuit 115 or not.

The reproduction horizontal sync pulse signal output from the extractor 6 is input to the clock terminal of the D-FF 122 to derive the output responsive to the input state to the data input terminal. The output of this D-FF 122 is supplied to the set terminal of the first FF 118 and the preset input terminal of the N-radix notation counter 112 to be control signals to make them perform prescribed operations, respectively.

The operation of this disc reproducing apparatus of FIG. 5 will be described in detail hereinbelow with respect to FIG. 6. With such a construction mentioned above, the 1st FF 118 is in the reset state during an ordinary operation, and the fundamental pulse signal being output by the fundamental pulse oscillator 110 is supplied to the N-radix notation counter 112 through the switching circuit 111. In this state, since a reference horizontal sync signal (E) is a stable signal having a frequency of 1/N times that of the fundamental pulse signal, this signal is a reference signal for the reproduction sync signal accompanied with the time base fluctuation.

Next, when the jump command signal (A) derived by a microprocessor or the like is generated, the MMV 119 is triggered thereby, and the content of the down counter 116 is preset to the value N−1 by the leading edge of its output pulse (G), and at the same time, the switching circuit 113 is closed for a period while its output pulse is obtained. Consequently, only the phase difference signal (F) output from the phase comparator 7 which is generated in that period is supplied to the AND gate 114 through the switching circuit 113 (refer to H), and the fundamental pulse signal is input to a subtraction clock terminal of the down counter 116. In accordance with this, number "n" corresponding to the phase difference signal (H) is subtracted from value "N−1" which has been preset in the down counter 116, so that value "N−1−n" is stored. After this process, the MMV 121 is triggered by a delayed jump pulse signal (A') which has been delayed by only approximate synchronizing period (1H) to produce a jump command pulse (B). The falling edge of the output pulse (B) herein does not exerts any influence on the FF 123. However, when the falling edge of the reproduction horizontal sync signal (C) which has been extracted fastest after this falling edge of the above-mentioned output pulse (B) is input to the clock terminal, it serves to invert its output (D) for the D-FF 122. The falling edge of this output signal (D) sets the FF 118 and presets the content of the N-radix notation counter into N−1. Once the FF 118 has been set to on, a common terminal of the switching circuit 111 changes its connection from a to b, so that the fundamental pulse signal is supplied to the AND gate 126 in place of the N-radix notation counter 112. The content of the N-radix notation counter is preset to N−1, so that its output (E) is inverted and its state is maintained until it receives an input later.

Next, after the jumping operation has been finished, when the output (B) of the MMV 121 becomes "1" after a predetermined period T has elapsed, the FF 123 is set by this leading edge (I) to close the switching circuit 124. Therefore, the reproduction horizontal sync pulse signal which is extracted fastest after the output (B) of the MMV 121 has been set to "1" passes through the switching circuit 124. The MMV 125 is triggered by the falling edge of this pulse signal, and the fundamental pulse signal supplied through the first switching circuit 111 for the period when the output pulse (J) exists by making the AND gate 126 open is supplied to the down counter 116 as the clock signal. The FF 123 is reset by the falling edge of the output (J) of the MMV 125 to make the switching circuit 124 open.

At this time, subtraction is started from value "N−1−n" stored in the down counter 117 by the falling edge of a prescribed reproduction horizontal sync pulse signal. When the value of the down counter 117 becomes "0", the output of the NOR circuit 117 which operates as a zero-detector is inverted (K) to reset the FF 118 (refer to point N of the putput pulse K). Thus, the switching circuit 111 is switched again and the fundamental pulse signal is supplied to the N-radix notation counter. At this time, since the content of the N-radix notation counter 112 has been preset to value N−1 by the falling edge of the signal (D), when the fundamental pulse signal is supplied to the N-radix notation counter 112, the output (E) is inverted by input of one pulse (refer to point 0 of the output (E)).

As obvious from the above-described operation, the relationship of the phases between the reference horizontal signal (E) immediately before the jumping operation and the reproduction horizontal sync signal (C) is stored in the down counter 116 while in the jumping operation, and this phase relation is reproduced after the end of the jumping period. That is to say, the down counter memorizes that by subtracting value n corresponding to the phase difference immediately before the jump from the count number N corresponding to the synchronization period (1H) of the reference sync signal, the time which is necessary until a specified edge of the reference sync signal to be generated next is generated after the generation of the particular edge of the reproduction horizontal sync signal corresponds to value N−n; consequently, the phase relation between both signals is reproduced by generating new reference sync signal after the time which corresponds to value N−n has elapsed from the particular edge of the reproduction sync signal immediately after the jump. In the embodiment, the N-radix notation counter 112 and the down counter 117 are off-set by only value one; this processing is performed to prevent that the generation of new reference sync pulse signal is delayed by synchronization period (1H).

Upon reproduction of the video disc, it is desirable to set the time until the phase difference information is obtained again after the jump into about 9H (horizontal sync period) since the equivalent pulse is inserted during the vertical blanking period. However, in the digital audio disc or the like, it is desirable to immediately start comparing the phases after the end of the jump since a problem is not caused.

This can be easily realized by appropriately set the time constant of the monostable multivibrator 121 or 125 in the embodiment.

Furthermore, it may be possible to use a sync signal whose phase can be compared even if it is not a pulse-like signal such as a pilot signal of a prescribed frequency.

With this detailed description of the specific control unit in the disc reproducing apparatus used to illustrate the preferred embodiments of the present invention, it will be obvious to those skilled in the art that various modifications can be made in the present system described herein without departing from the spirit and scope of the invention which is limited only by the appended claims.

What is claimed is:

1. A time base control unit in an apparatus for reading and reproducing information recorded on an information recording disc, said information recorded on the information recording disc in the form of one or more tracks extending circumferentially thereof, the reading and reproducing apparatus has means for generating a jump command signal and includes, (a) rotation driving means for rotating the information recording disc; (b) information pick-up means for reading a recorded information signal from a target track by means of a reading spot aligned onto said target track; and (c) tracking servo means for performing tracking servo control for said reading spot while performing a jump operation of said reading spot from one track to another track in accordance with the jump command, comprising:

sync separating means for separating a sync signal from the reproduction information signal read;

reference signal generating means for generating a reference signal of a prescribed frequency;

phase difference detecting means for detecting a phase relation between said sync signal and said reference signal and for producing a phase difference signal;

time base servo means for compensating the time base fluctuation of said reproduction information signal in accordance with said phase difference signal; and said reference signal generating means includes means for synchronizing the phase of said reference signal relative to said sync signal at the end of or immediately after jump operation with the phase of said reference signal relative to said sync signal at the beginning of said jump operation or immediately after the beginning thereof, in response to said jump command.

2. The time base control unit according to claim 1, wherein said reference sync signal generating means and means for synchronizing include fundamental signal generating means for generating a fundamental pulse signal of the repetition frequency of N times (N is an arbitrary integer of 2 or more) as a prescribed frequency of said reference sync signal, accumulating means for accumulating pulses of said fundamental pulse signal and for dividing said fundamental pulse signal by N, and stopping means for stopping supply of said fundamental pulse signal to said accumulating means during a predetermined time period from the generation of said jump command.

3. The time base control unit according to claim 2, wherein said accumulating means is an N-radix notation counter.

4. The time base control unit according to claim 2, wherein said stopping means comprises a monostable multivibrator for generating a trigger pulse having a prescribed pulse width in response to said jump command, a D-type flip-flop which uses said trigger pulse as a data input and said reproduction sync signal as a clock input, and a gate circuit interposed between said fundamental pulse signal generating means and said integrating means for turning on or off in response to an output of said D-type flip-flop.

5. The time base control unit according to claim 1, wherein said reference signal generating means and said means for synchronizing include means for storing information of the phase difference between said reference signal and said sync signal at the time of or immediately after generation of said jump command, and include means for determining the phase of said sync signal at the end of the jump operation in accordance with said phase difference information.

* * * * *